(12) United States Patent
Skoglund et al.

(10) Patent No.: US 12,171,247 B2
(45) Date of Patent: *Dec. 24, 2024

(54) INSULATION PLATE TO MINIMIZE ENERGY CONSUMPTION FOR ICE CREAM MOULDING

(71) Applicant: Tetra Laval Holdings & Finance S.A., Pully (CH)

(72) Inventors: Tomas Skoglund, Lund (SE); Tommy Bonde, Silkeborg (DK); Ole Bendixen, Galten (DK); Per Henrik Hansen, Malling (DK)

(73) Assignee: Tetra Laval Holdings & Finance S.A., Pully (CH)

( * ) Notice: Subject to any disclaimer, the term of this patent is extended or adjusted under 35 U.S.C. 154(b) by 75 days.

This patent is subject to a terminal disclaimer.

(21) Appl. No.: 17/612,537

(22) PCT Filed: Jun. 24, 2020

(86) PCT No.: PCT/EP2020/067732
§ 371 (c)(1),
(2) Date: Nov. 18, 2021

(87) PCT Pub. No.: WO2020/260407
PCT Pub. Date: Dec. 30, 2020

(65) Prior Publication Data
US 2022/0295821 A1    Sep. 22, 2022

(30) Foreign Application Priority Data
Jun. 26, 2019  (EP) ..................... 19182749

(51) Int. Cl.
A23G 9/22    (2006.01)
A23G 9/08    (2006.01)
(Continued)

(52) U.S. Cl.
CPC ............. *A23G 9/221* (2013.01); *A23G 9/083* (2013.01); *A23G 9/26* (2013.01); *A23G 9/503* (2013.01); *B05B 1/205* (2013.01)

(58) Field of Classification Search
None
See application file for complete search history.

(56) References Cited

U.S. PATENT DOCUMENTS 1,658,931 A * 2/1928 Meyer ................. A23G 9/227
                                                     62/433
1,988,906 A    1/1935 Corte et al.
(Continued)

FOREIGN PATENT DOCUMENTS

CA         837327 A     3/1970
EP       0039513 A2    11/1981
(Continued)

OTHER PUBLICATIONS

International Search Report mailed Sep. 16, 2020, for priority International Patent Application No. PCT/EP2020/067732.
(Continued)

*Primary Examiner* — Emmanuel S Luk
(74) *Attorney, Agent, or Firm* — Renner, Otto, Boisselle & Sklar, LLP

(57) ABSTRACT

A mould arrangement for moulding ice cream products includes an upper metal plate, and a plurality of mould pockets that each protrude from a bottom side of the upper metal plate. An insulation plate is arranged adjacent the bottom side of the upper metal plate and the plurality of mould pockets extend through the lower insulation plate.

14 Claims, 9 Drawing Sheets

(51) Int. Cl.
  *A23G 9/26* (2006.01)
  *A23G 9/50* (2006.01)
  *B05B 1/20* (2006.01)

(56) References Cited

U.S. PATENT DOCUMENTS

| | | | | |
|---|---|---|---|---|
| 2,112,263 | A * | 3/1938 | Bohannon | F25C 1/24 |
| | | | | 62/350 |
| 3,091,194 | A * | 5/1963 | Dickinson | A23G 9/48 |
| | | | | 62/62 |
| 3,240,610 | A * | 3/1966 | Cease | B65D 11/00 |
| | | | | 206/508 |
| 3,261,178 | A | 7/1966 | Katsuto | |
| 3,535,889 | A | 10/1970 | Curti | |
| 3,695,895 | A | 10/1972 | Brown | |
| 3,770,460 | A | 11/1973 | Vroman | |
| 4,314,650 | A * | 2/1982 | Cillario | B65D 71/00 |
| | | | | 426/115 |
| 4,425,089 | A | 1/1984 | Billett et al. | |
| 4,600,592 | A * | 7/1986 | Dobis | A23G 3/28 |
| | | | | 426/282 |
| 4,761,128 | A * | 8/1988 | Fowler | A23G 9/04 |
| | | | | 425/395 |
| 5,088,301 | A * | 2/1992 | Piepenbrink | A47G 19/027 |
| | | | | 62/457.1 |
| 5,269,217 | A * | 12/1993 | Goad | A47J 27/18 |
| | | | | 126/369 |
| 5,871,783 | A * | 2/1999 | Capodieci | A23G 7/0018 |
| | | | | 425/298 |
| 6,216,472 | B1 * | 4/2001 | Cathenaut | A23G 9/221 |
| | | | | 425/126.2 |
| 6,264,854 | B1 * | 7/2001 | Hayes | C09K 5/18 |
| | | | | 432/12 |
| 6,376,803 | B1 * | 4/2002 | Klinger | A47J 39/006 |
| | | | | 219/403 |
| 7,780,028 | B2 * | 8/2010 | Hoffine | A47G 23/0683 |
| | | | | 220/23.89 |
| 8,961,163 | B2 * | 2/2015 | Zorovich | A23G 9/083 |
| | | | | 425/126.2 |
| 2005/0000373 | A1 * | 1/2005 | Coe | F25D 3/08 |
| | | | | 99/567 |
| 2010/0183789 | A1 * | 7/2010 | Zorovich | F25D 3/005 |
| | | | | 165/181 |
| 2017/0321942 | A1 * | 11/2017 | Sherman | A23G 9/22 |
| 2019/0011167 | A1 * | 1/2019 | Larson | F25C 5/08 |
| 2020/0033042 | A1 * | 1/2020 | Junge | F25C 1/22 |
| 2020/0158407 | A1 * | 5/2020 | Kim | F25C 5/08 |

FOREIGN PATENT DOCUMENTS

| | | |
|---|---|---|
| FR | 2568452 A1 | 2/1986 |
| GB | 509411 A | 7/1939 |
| GB | 2245474 A | 1/1992 |
| KR | 20150095438 A | 8/2015 |
| WO | 1995024133 A1 | 9/1995 |

OTHER PUBLICATIONS

Extended European Search Report issued Dec. 2, 2019, for priority European Patent Application No. 19182749.2.

* cited by examiner

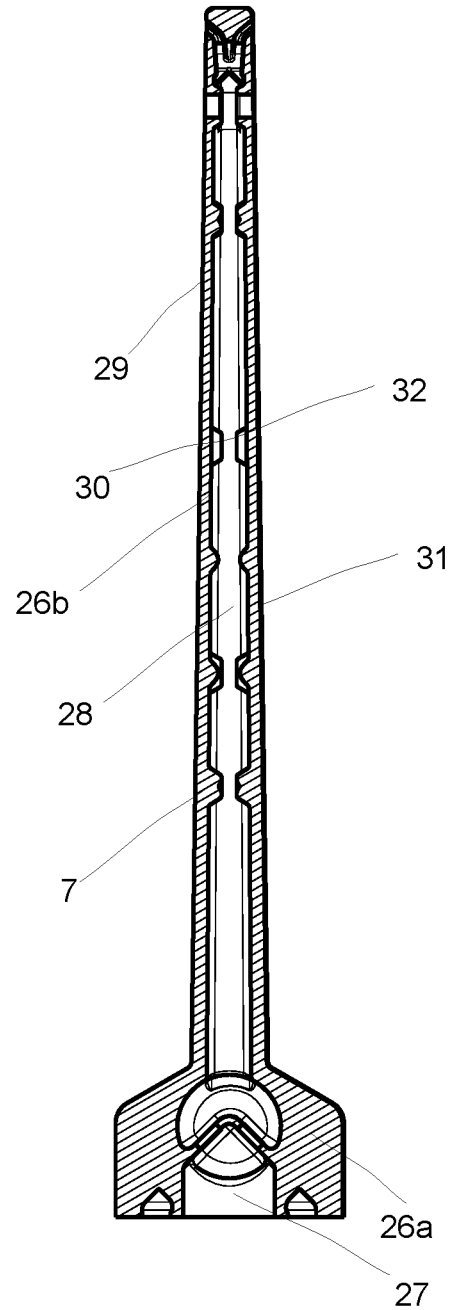
Fig. 12 (A-A)
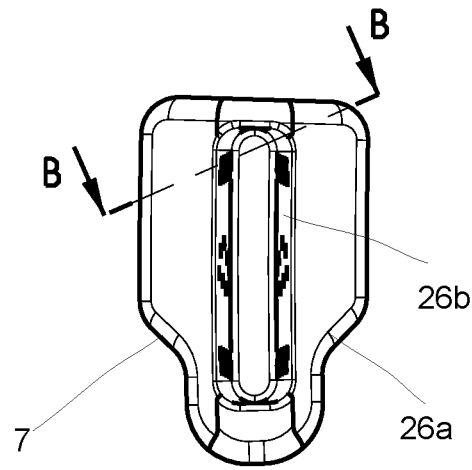
Fig. 13
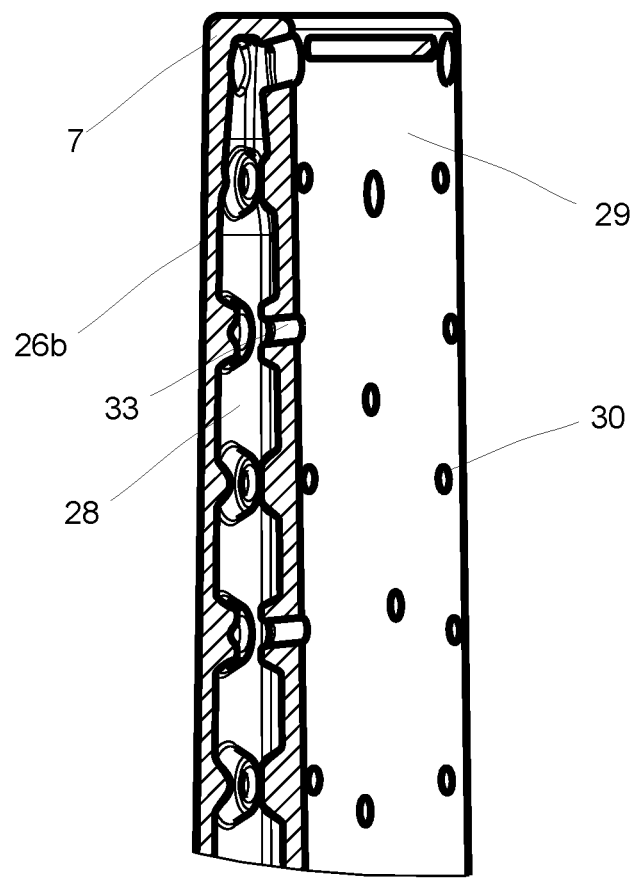
Fig. 14 (B-B)

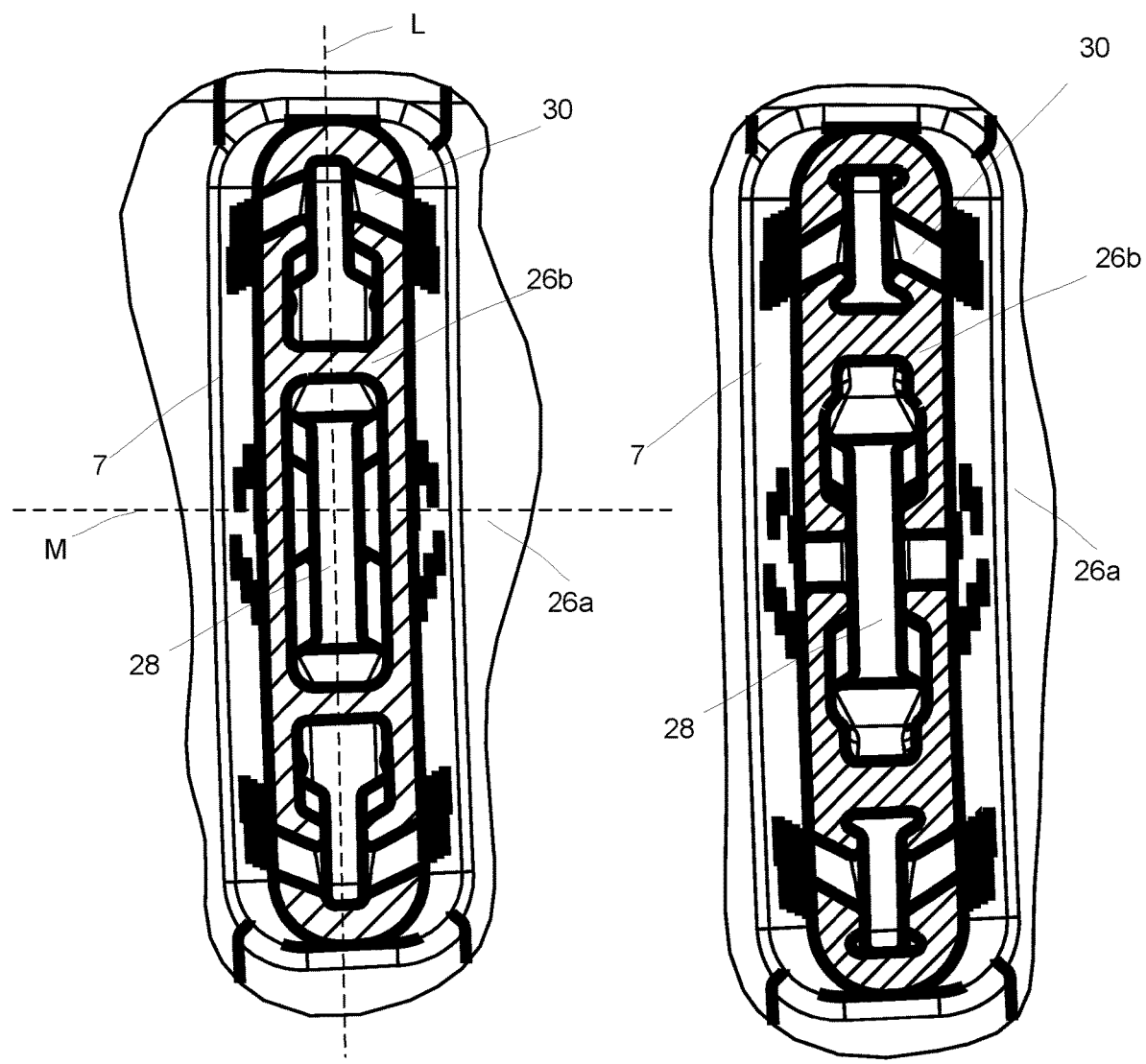
Fig. 15 (D-D)    Fig. 16 (E-E)

INSULATION PLATE TO MINIMIZE ENERGY CONSUMPTION FOR ICE CREAM MOULDING

TECHNICAL FIELD

The invention relates to a mould arrangement for moulding ice cream products and a method for processing ice cream with the mould arrangement.

TECHNICAL BACKGROUND

Ice cream products are formed by filling ice cream or water ice mix, which typically is a blend of sugar, fruit concentrates, stabilizers, flavor and color, into moulds and freezing the ice cream or water ice mix to produce stick novelties. The moulds may be formed as moulded-in pockets that are arranged in horizontally rotating mould tables or linear moulding lines. The ice cream is supplied directly from a continuous freeze and the mix in the moulds is gradually frozen by a cold brine solution which freezes the contents through the mould wall. Sticks may be inserted into the ice cream in the moulds before the ice cream is completely frozen. Removing the frozen products requires passing the moulds through a warm brine solution which slightly melts the surfaces of the products and enables the products to be removed automatically by an extractor unit. Conventional brine heating occurs by pumping the brine through nozzles that are directed upwardly to the moulds, such that the moulds are continuously flushed by the warm brine. The conventional ice cream moulding arrangements and methods are generally operated in a satisfying manner. However, a lot of energy is required, both for accomplishing the cooling and the subsequent heating. Another disadvantage of conventional heating processes is in some cases that, prior to extrusion, an undesirable amount of ice cream may be melted and the product may be lost.

SUMMARY

It is an object of the invention to at least partly overcome one or more limitations of the prior art. In particular, it is an object to provide a mould arrangement that is configured to use less energy compared to the prior art techniques. For some embodiments of the invention an object may be to more efficiently direct a heating fluid to the mould pockets of the mould arrangement.

According to an aspect of the invention, a mould arrangement for moulding ice cream products includes an upper metal plate, and a plurality of mould pockets that each protrude from a bottom side of the upper metal plate. An insulation plate is arranged adjacent the bottom side of the upper metal plate and the plurality of mould pockets extend through the insulation plate.

The mould arrangement described herein is advantageous in both reducing the amount of metal that is exposed to temperature variations while also providing mechanical support for the mould pockets. The insulation plate also reduces the amount of energy required for accomplishing the desired cooling and/or heating. The insulation plate is formed of an insulation layer having an insulating material, such as a foam material, and at least one support layer that is attached to the insulation layer to support the insulation layer. A support layer may be arranged on each side of the insulation layer and the support layers may be formed of a stiffer material relative to the insulation layer, such as a carbon fiber material. Using the sandwich-type construction of the insulation plate insulates the mould pockets by reducing an amount of metal that is exposed to the temperature variation and also provides mechanical support for the metal plate such that e.g. conventional support bars may be replaced by the insulation plate.

The insulation plate may incorporate a number of properties, such as one or more of the following properties: The insulation plate is a thermal insulation plate. The insulation plate may have a lower density than the metal plate. The insulation plate may have a thermal conductivity that is lower than the thermal conductivity of the metal plate. The thermal conductivity of the insulation plate may be less than 1 W/mK, or less than 0.2 W/mK, or even less than that. The insulation plate may be made of a different material than the metal plate. The insulation plate may comprise cellular plastics. The insulation plate may be made of at least 50% cellular plastics. The insulation plate may be fiber reinforced. The insulation plate may be in direct contact with the metal plate.

The metal plate may be made of stainless steel. The thermal conductivity of the metal plate is typically at least 14 W/mK.

According to another aspect of the invention, an ice cream mould table includes the mould arrangement and a spray nozzle arrangement having a plurality of spray nozzles that are arranged to extend between the plurality of mould pockets in an alternating arrangement. The spray nozzle arrangement is advantageous in enabling the even heating of the mould pockets by directing a heating fluid to the exterior surface of the mould pockets and to upper parts of the mould pockets that may not be reached by conventional spray nozzles. Accordingly, less energy is wasted during heating as compared with conventional spray nozzle arrangements that may continuously provide heating fluid to areas in which the mould pockets are not located.

According to still another aspect of the invention, a method for processing ice cream with a mould table includes inserting ice cream into mould pockets arranged in a mould arrangement, moving the mould pockets, by movement of the mould arrangement, to a first position at which a cooling fluid is supplied to an exterior surface of the mould pockets, such that a temperature of the ice cream in the mould pockets decreases, and moving the mould pockets, by movement of the mould arrangement, to a second position at which the mould pockets pass by the spray nozzle arrangement that supplies a heating fluid to the exterior surface of the mould pockets, such that a temperature of the ice cream in the mould pockets increases to thereby facilitate extraction of the ice cream from the mould pockets.

Although various aspects of the invention are set out in the accompanying independent claims, other aspects of the invention may include any combination of features from the described features and/or the accompanying dependent claims with the features of the independent claims, and not only the combinations explicitly set out in the accompanying claims.

BRIEF DESCRIPTION OF THE DRAWINGS

Features of the invention will now be described, by way of example, with reference to the accompanying schematic drawings.

FIG. 12 is a cross-sectional view of the spray nozzle taken along cut A-A shown in FIG. 9.

FIG. 13 is a cross-sectional view of the top of the spray nozzle shown in FIG. 9.

FIG. 14 is a detailed and partially cross-sectional view of a portion of the spray nozzle taken along cut B-B shown in FIG. 13.

FIG. 15 is a cross-sectional view of a top portion of the spray nozzle taken along cut D-D in FIG. 9.

FIG. 16 is a cross-sectional view of a top portion of the spray nozzle taken along cut E-E in FIG. 9.

DETAILED DESCRIPTION

The device and method according to the present invention may be used e.g. in a rotary or in-line moulding machine for producing ice cream products. As described herein, "ice cream products" may refer to any suitable products, such as stick novelties or bars, that are formed by a moulding machine. Suitable products may include those formed of ice cream, sorbet, sherbet, frozen yogurt, or other related frozen products that are formed by moulding.

The present invention pertains to a mould arrangement for a mould table, and a method using a plurality of mould pockets that protrude from a bottom side of an upper metal plate of the mould arrangement, as viewed from a horizontal plane in which the mould arrangement is arranged. An insulation plate is arranged adjacent the bottom side of the upper metal plate and lower than the upper metal plate. The plurality of mould pockets extend downwardly from the upper metal plate and through the insulation plate.

Advantageously, the insulation plate has a sandwich-type construction in which an insulating material is interposed between two supporting layers. Using the insulating material enables insulation of the metal material in the mould arrangement to reduce temperature variation. At least one of the supporting layers provides mechanical support for the mould pockets, such that the insulation plate may replace conventional support bars that were previously used to support the pockets. Reducing the temperature variation in the metal material of the mould arrangement enables more optimized heating and cooling by reducing an amount of energy wasted as compared with conventional heating and cooling methods that require repeated cooling and heating. Consequently, the product quality of the ice cream products will also be improved as less surface of the ice cream product will be heated and less product will be lost.

Referring first to FIGS. 1-5, an exemplary mould arrangement 1 for moulding ice cream products is shown. The mould arrangement 1 includes an upper metal plate 2 and a plurality of mould pockets 3 that each protrude from a bottom side 4 of the upper metal plate 2, as viewed relative to a horizontal plane of the mould arrangement 1. The upper metal plate 2 is planar in shape and the mould pockets 3 protrude in a direction that is normal to the upper metal plate 2. When the mould arrangement 1 is arranged as part of a mould table in rotary moulding machine, the upper metal plate 2 may have the form of a section of a circle and configured for rotation. Several such metal plates together form a circular plate. Optionally, the entire plate may be circular. In a linear mould table, the mould arrangement 1 may be rectangular in shape and configured for linear movement. The upper metal plate 2 is formed of any suitable metal material, such as steel or more particularly, stainless steel.

Figure 1:
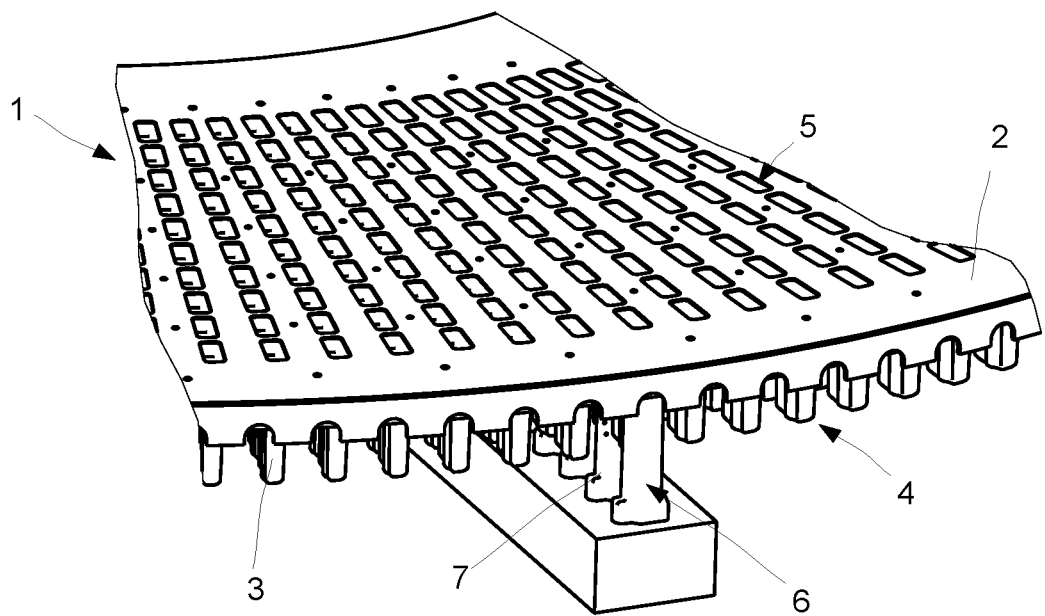
FIG. 1 is a perspective view of a top side of a mould arrangement for moulding ice cream products.
Figure 2:
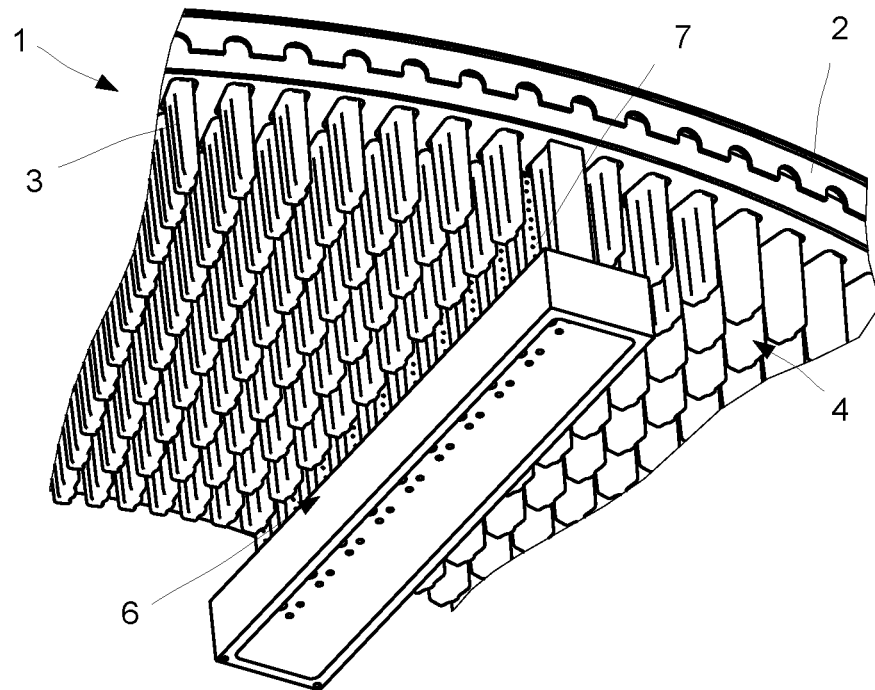
FIG. 2 is a perspective view of a bottom side of the mould arrangement shown in FIG. 1.

Each of the mould pockets 3 has an opening 5 in the upper metal plate 2 that opens from the mould pocket 3 to outside the mould arrangement 1 for receiving the ice cream product or ice water mix through the opening 5, as best shown in FIG. 1. The openings 5 are larger than the mould pockets 3. A stick may also be inserted into the openings 5 before the ice cream product is completely frozen for producing stick novelty ice cream products. As shown in FIGS. 1 and 2, the mould pockets 3 may be arranged in an ordered pattern such that the mould pockets 3 are aligned in rows and columns along the upper metal plate 2. Any suitable number of mould pockets 3 may be provided and each mould pocket 3 may have the same size and shape for producing uniform ice cream products.

The mould arrangement 1 is part of an ice cream mould table that also includes a spray nozzle arrangement 6 by which the mould pockets 3 pass for receiving a cooling or a heating fluid that enables cooling of or extraction of the ice cream products from the mould pockets 3. The spray nozzle arrangement 6 includes a plurality of spray nozzles 7 that are arranged to extend between adjacent mould pockets 3. The spray nozzle arrangement 6 may be fixed to the mould table such that the mould arrangement 1 moves or rotates relative to the fixed spray nozzles 7. For example, each spray nozzle 7 may be fixed to a supporting mount 8 of the mould table. Alternatively, the spray nozzle arrangement 6 may be configured to move relative to the mould arrangement 1. The number of spray nozzles 7 may be dependent on the number of mould pockets 3 and the spray nozzles 7 may have an alternating arrangement with the mould pockets 3 to ensure that each mould pocket 3 is arranged between two adjacent spray nozzles 7. Any suitable number of spray nozzle arrangements 6 may be provided for a single mould table.

Figure 3:
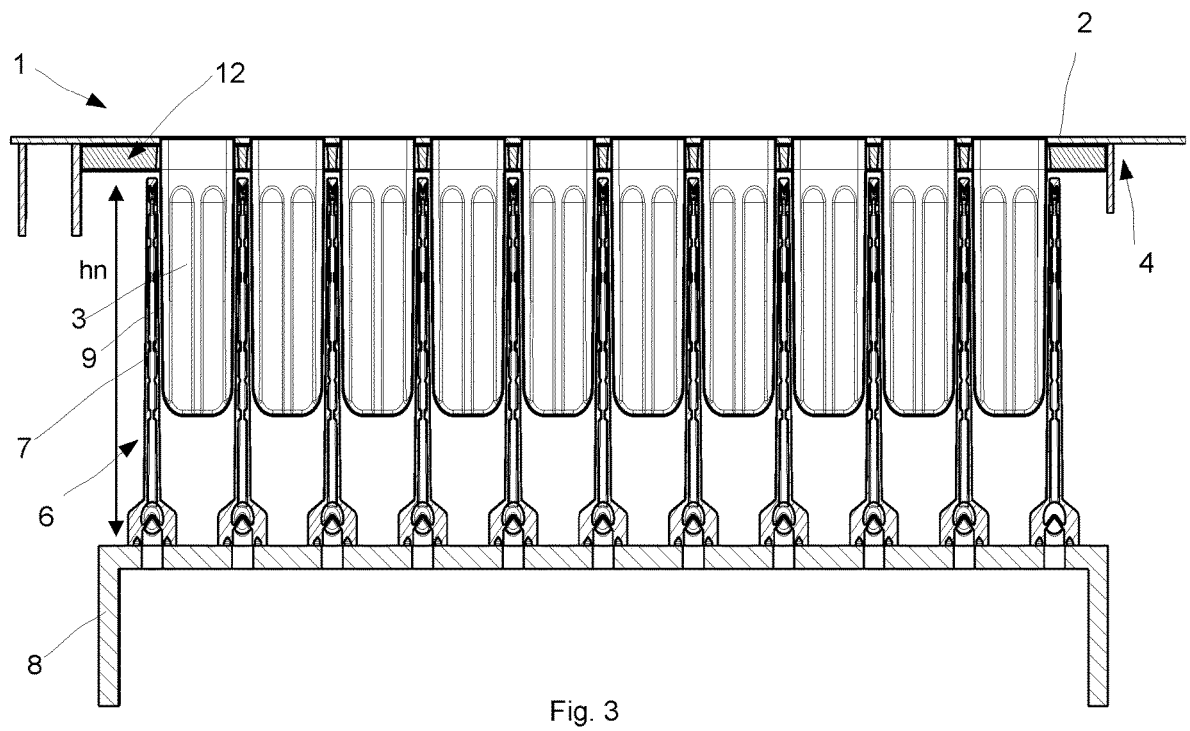
FIG. 3 is a cross-sectional view of the mould arrangement shown in FIG. 1.
Figure 4:
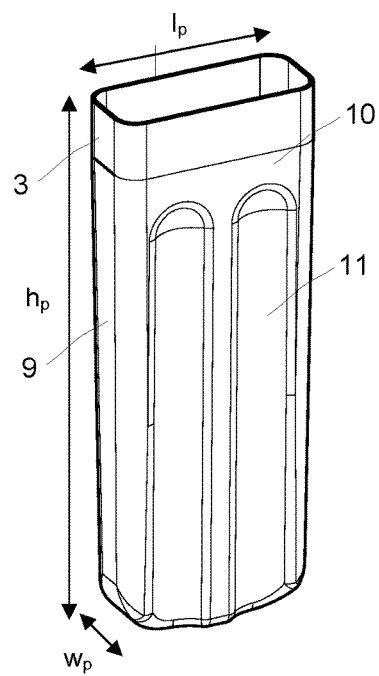
FIG. 4 is a perspective view of a side of a mould pocket of the mould arrangement shown in FIG. 1.
Figure 5:
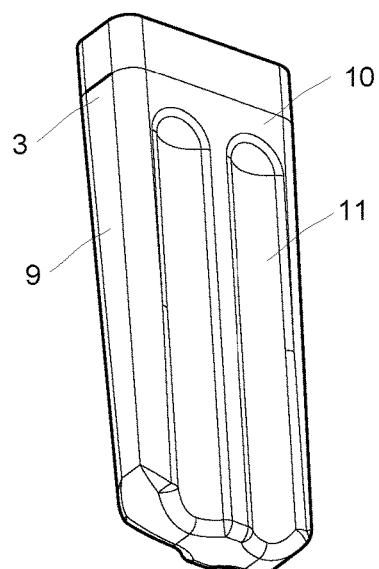
FIG. 5 is a perspective view of a bottom side of the mould pocket shown in FIG. 4.

As best shown in FIG. 3, each spray nozzle 7 faces at least one side wall 9 of an adjacent mould pocket 3. Each mould pocket 3 has opposite side walls 9 that define a width $w_p$ of the mould pocket 3. The width $w_p$ of the mould pocket 3 is less than both a length $l_p$ and a height $h_p$ of the mould pocket 3. Longer side walls 10 of the mould pockets 3 define the length of between the side walls 9. The spray nozzles 7 have a height $h_n$ that extends along more than half of the height $h_p$ of the plurality of mould pockets 3. The spray nozzles 7 may extend along most of the height $h_p$ of the plurality of mould pockets 3 to ensure that heating fluid is directed along a maximum surface area of the mould pockets 3. The spray nozzles 7 and the mould pockets 3 may have any suitable heights. For example, the height $h_p$ of the mould pockets may be between 100 and 180 millimeters. The shape of the mould pockets 3 is dependent on the desired shape of the ice cream product to be produced. The mould pockets 3 may each have a cuboid or nearly cuboid shape. The side walls 10 of the mould pockets 3 may also include depressions 11 or recesses.

Figure 6:
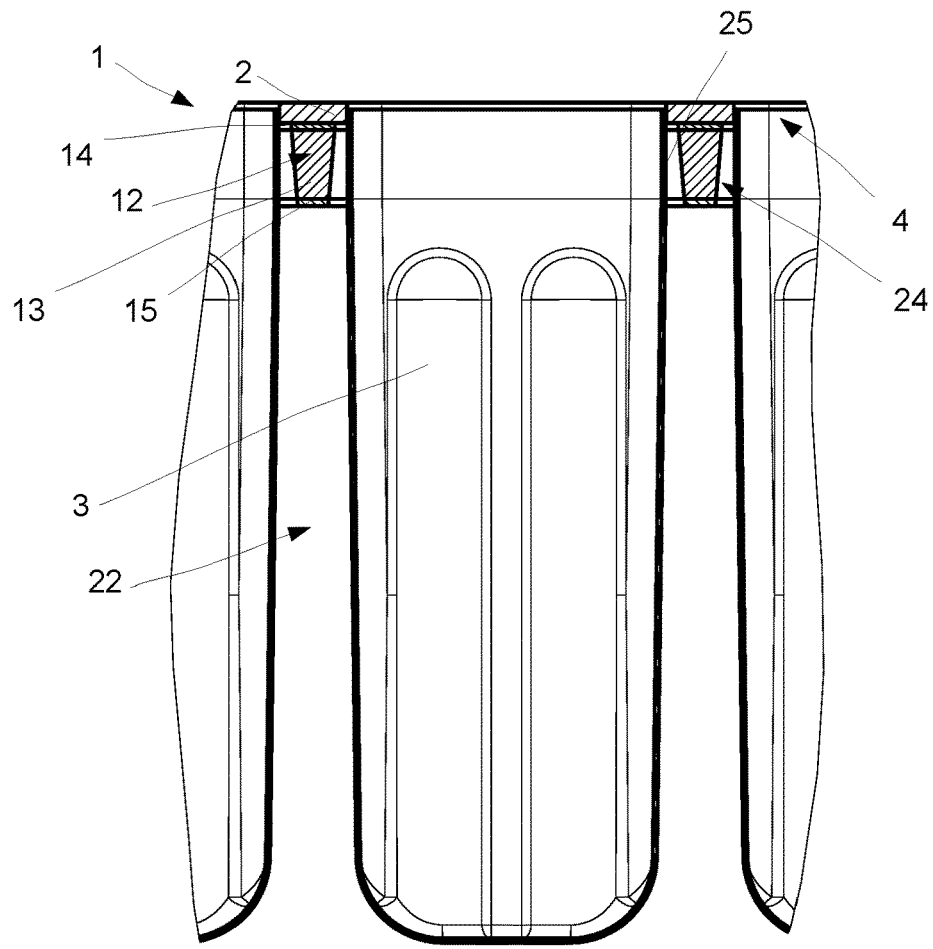
FIG. 6 is a cross-sectional view of one of the mould pockets of the mould arrangement shown in FIG. 1.
Figure 7:
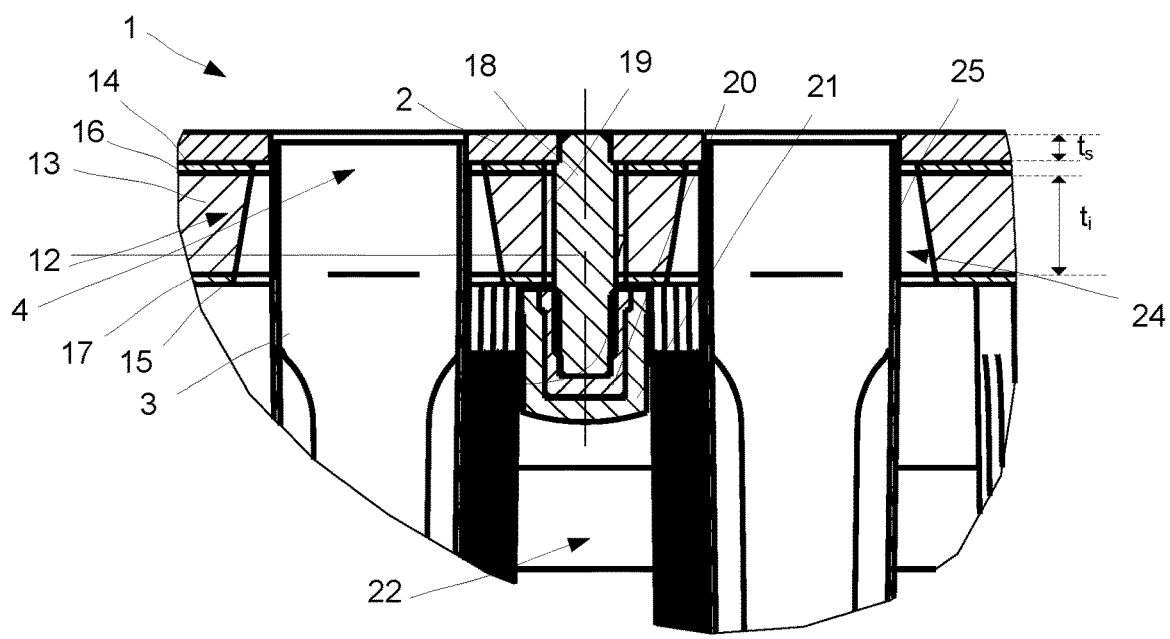
FIG. 7 is a detailed and partial cross-sectional view the mould arrangement shown in FIG. 1.
Figure 8:
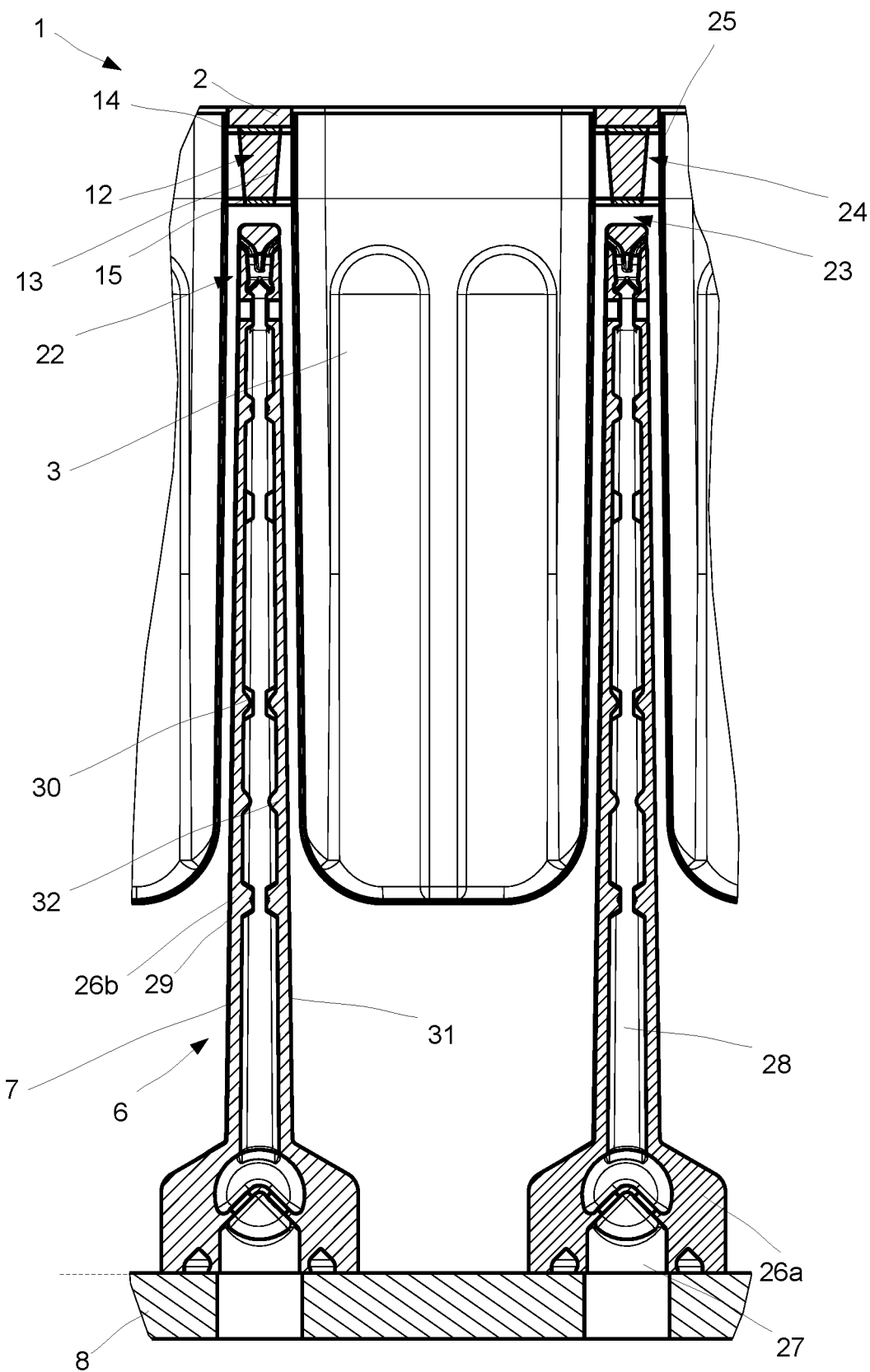
FIG. 8 is a cross-sectional view of a mould pocket of the mould arrangement shown in FIG. 1, when located between spray nozzles of an ice cream mould table.

Referring in addition to FIGS. 6-8, the mould arrangement 1 includes an insulation plate 12 that is arranged adjacent the bottom side 4 of the upper metal plate 2 such that the insulation plate 12 is arranged lower than the upper metal plate 2 relative to the horizontal plane of the mould arrangement 1. The insulation plate 12 is generally planar in shape and extends along a plane that is parallel with the plane in which the upper metal plate 2 extends. The plurality of mould pockets 3 extend through the insulation plate 12 and to a lower position relative to the insulation plate 12. The insulation plate 12 includes an insulation layer 13 that is formed of any suitable insulating material and may have any suitable thickness $t_i$. The insulation plate 12 is formed of at least two different materials. The thickness $t_i$ extends along the height $h_p$ of the mould pockets 3, and may be greater than a thickness $t_s$ of the upper metal plate 2 and less than the height $h_p$ of the mould pockets 3. A suitable insulating material is foam and a suitable thickness $t_i$ may be between 6 and 18 millimeters. The insulation layer 13 may have a thickness $t_i$ that is approximately 10 millimeters and an entire thickness of the insulation plate 12 may be between 6 and 18 millimeters.

The thermal conductivity of the metal plate 2 is typically at least 10 W/mK, or at least 14 W/mK. The thermal conductivity of the insulation layer 13 may be less than 1 W/mK, or less than 0.2 W/mK, or even less than that. The insulation layer 13 may be made of a different material than the metal plate 2. The insulation layer 13 may comprise cellular plastics. The thermal insulation layer 13 may be made of at least 50% cellular plastics. The insulation layer 13 may be fiber reinforced.

The insulation plate 12 includes at least one support layer 14, 15 that is attached to the insulation layer 13. The at least one support layer 14, 15 has a thickness that is less than the thickness $t_i$ of the insulation layer 13 and the at least one support layer 14, 15 may be formed of a material that is stiffer than the material of the insulation layer 13. For example, the support layer 14, 15 may have a thickness of approximately 1 millimeter and may be formed of carbon fiber. The insulation plate 12 may include two support layers 14, 15 that are planar and extend parallel with each other and the insulation layer 13. When two support layers 14, 15 are provided, the insulation layer 13 is interposed or sandwiched between the two support layers 14, 15. The two support layers 14, 15 may include a first or upper support layer 14 that is interposed between the upper metal plate 2 and the insulation layer 13, and a second or lower support layer 15 that is arranged adjacent the insulation layer 13 opposite to the upper support layer 14. As best shown in FIG. 7, the first support layer 14 is attached to a first side 16 of the insulation layer 13 and the second support layer 15 is attached to a second side 17 of the insulation layer 13 that is opposite the first side 16. The two support layers 14, 15 may be formed of a same material, such as carbon fiber, and the support layers 14, 15 may be attached to the insulation layer 13 using any suitable attachment mechanism or method. For example, an adhesive material may be used.

The insulation plate 12 is secured to the upper metal plate 2 using any suitable securing element, such as at least one of a bolt, nut, screw, peg, pin, clamp, fastener, or any combination thereof. The securing element may be arranged to extend through the upper metal part 2 and the insulation plate 12 in a direction normal to the parallel planes of the upper metal part 2 and the insulation plate 12. For example, the securing element may include a peg 18 that extends downwardly through an aperture 19 formed in the insulation plate 12. The peg 18 may be integrally formed as a protrusion of the upper metal plate 2 or the peg 18 may be formed separately and joined to the upper metal plate 2, such as by welding. A plurality of pegs 18 may be provided and a corresponding number of apertures 19 may be provided in the insulation plate 12. The peg 18 extends through the aperture 19 to be received within a nut 20 that is arranged proximate the lower support layer 15 of the insulation plate 12. The nut 20 is arranged on the end of the peg 18. The connection between the peg 18 and the nut 20 may be further secured via glue or welding when the insulation plate 12 is assembled. Additionally, a plastic part or barrier cap 21 may be arranged over the peg 18 and the nut 20.

Forming the insulation plate 12 as a composite plate having both an insulating material and a stiffer supporting material is advantageous for both the function and structure of the mould arrangement 1. The insulation plate 12 insulates the steel mould table by being in contact with the metal of the mould table, such that temperature variation in the table is reduced. Using at least one support layer, such as the upper support layer 14, is also advantageous in providing structural support for the mould pockets 3 and the table. Due to the structural support provided by the support layers in the insulation plate 12, the insulation plate 12 may replace conventionally used support bars in known mould tables.

The insulation plate 12 is configured to surround the mould pockets 3 by extending through vertically extending regions 22 in which the spray nozzles 7 of the spray nozzle arrangement 6 are also arranged. The vertically extending regions 22 are defined between adjacent mould pockets 3 and each spray nozzle 7 may extend upwardly into and through the corresponding vertically extending region 22 toward the insulation plate 12, as best shown in FIG. 8. Each spray nozzle 7 may accommodate most of a volume of the vertically extending region 22. A gap 23 may be defined between a top of the spray nozzle 7 and the lower support layer 15 to prevent contact between the spray nozzle 7 and the insulation plate 12. The insulation plate 12 is also formed to define a plurality of spaces or through-openings 24 between the insulation plate 12 and exterior walls 25 of the adjacent mould pockets 3. The through-openings 24 extend around an entire peripheral surface of the mould pockets 3 such that the mould pockets 3 extend downwardly through the through-openings 24. Providing the through-openings 24 is advantageous in enabling fluid from the spray nozzle arrangement 6 to reach the upper part of the exterior wall 25 of the mould pocket 3, particularly during heating of the mould pockets 3.

Each through-opening 24 may have any suitable shape. The shape of the through-opening 24 may be a tapered shape. For example, the width of the through-opening 24 may increase along the thickness of the insulation plate 12 from the upper support layer 14 toward the lower support layer 15. The through-opening 24 may have a width that is 2 millimeters proximate the upper support layer 14 and a width that is 3 millimeters proximate the lower support layer 15 such that the width of the through-opening 24 gradually increases. Other dimensions may be suitable. The width of the mould pocket 3 may be constant along the height of the mould pocket 3 such that the portion of the insulation plate 12 that extends downwardly is formed to taper inwardly from the upper support layer 14 toward the lower support layer 15, thereby forming the tapered through-opening 24.

Figure 9:
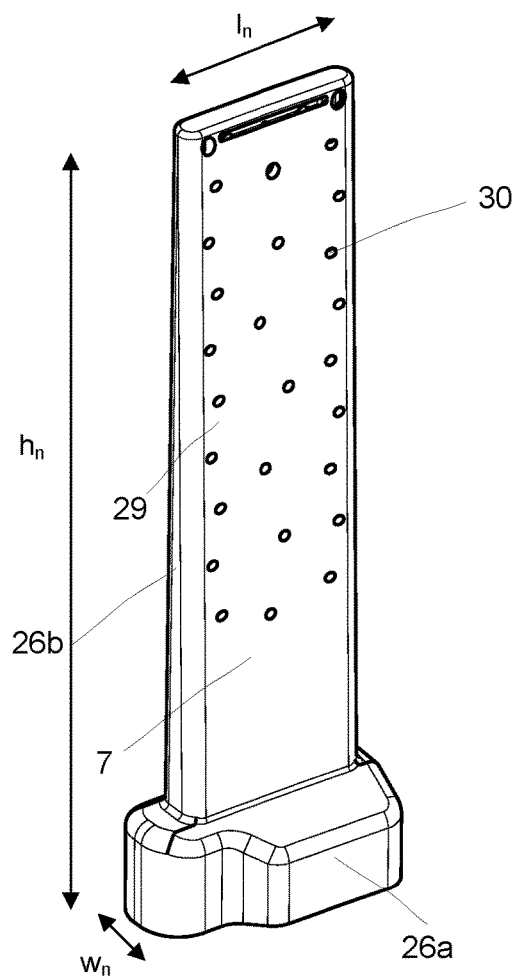
FIG. 9 is a perspective view of one of the spray nozzles of FIG. 8.
Figure 10:
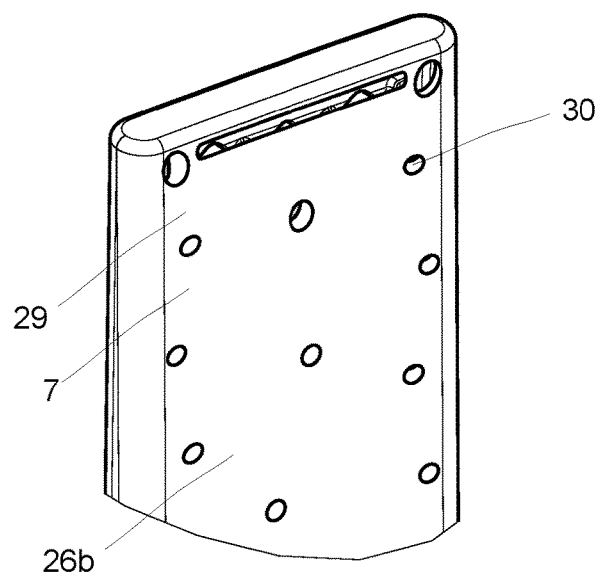
FIG. 10 is a detailed perspective view of a top portion of the spray nozzle shown in FIG. 9.
Figure 11:
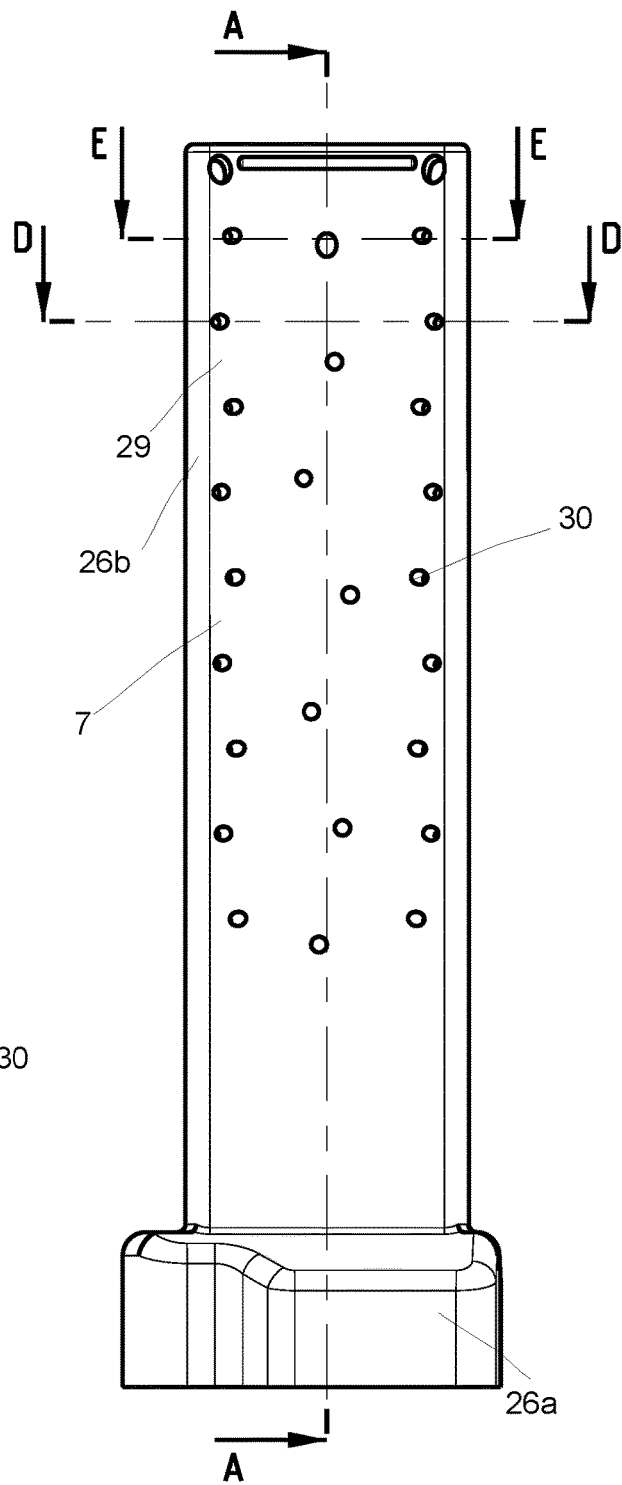
FIG. 11 is a front view of the spray nozzle shown in FIG. 9.

Referring now to FIGS. 8-16, further details of the spray nozzle arrangement 6 are shown. FIG. 8 shows each spray nozzle 7 of the spray nozzle arrangement 6 being configured to be adjacent two mould pockets 3. FIGS. 9-11 show details of the individual spray nozzle 7. FIG. 12 shows a cross-sectional view of the spray nozzle 7 taken along a cut A-A shown in FIG. 11. FIG. 13 shows a bottom view of the spray nozzle 7. FIG. 14 shows a cross-sectional view of the spray nozzle 7 taken along a cut B-B shown in FIG. 13. FIG. 15 shows a cross-sectional view of the spray nozzle 7 taken along a cut D-D shown in FIG. 11 and FIG. 16 shows a cross-sectional view of the spray nozzle 7 taken along a cut E-E shown in FIG. 11.

The spray nozzles 7 may have any suitable shape, such as a cuboid shape that may be similar in shape to the cuboid shape of the mold pockets 3. The height $h_n$ of the spray nozzles 7 may be greater than the length $l_n$ and the width $w_n$. Each spray nozzle 7 may have a base portion 26a that is secured to the supporting mount 8 of the mould table and an upper portion 26b that extends upwardly from the base portion 26a. The base portion 26a may have a width and a length that is greater than a width of the upper portion 26b, and the upper portion 26b may have a height that is greater than a height of the base portion 26a. The width of the upper portion 26b may decrease as the upper portion 26b extends from the base portion 26a such that the upper portion 26b is tapered. The base portion 26a may define a fluid passage 27 that is in communication between a fluid source and a fluid passage 28 defined in the upper portion 26b. The fluid passage 28 may extend along the entire height $h_n$ or nearly an entire height $h_n$ of the spray nozzle 7 to ensure that fluid is distributed from a maximum surface area of the spray nozzle 7.

The upper portion 26b includes at least one surface 29 that defines a plurality of spray openings 30 and faces the side wall 25 of the adjacent mould pocket 3. The spray openings 30 are in fluid communication with the fluid passage 28 for receiving fluid and directing fluid toward the mould pockets 3. The surface 29 may be substantially flat or planar in shape. As best shown in FIGS. 8 and 12, each upper portion 26b of the spray nozzle 7 may include two opposing surfaces 29, 31 that each define a plurality of spray openings 30, 32. Accordingly, a single spray nozzle 7 is configured to provide fluid to two mould pockets 3 between which the spray nozzle 7 is arranged. Any suitable number of spray openings 30, 32 may be provided and the spray openings 30, 32 may have any suitable pattern. Each spray nozzle 7 in the nozzle arrangement 6 may have the same number of spray openings 30, 32 and the same spray opening pattern, or each spray nozzle 7 may have a different number of spray openings 30, 32 and a different spray opening pattern. For example, each surface 29, 31 may have between 20 and 30 spray openings 30, 32. The spray openings 30, 32 may be spaced such that the pattern of spray openings 30, 32 covers most of the surface area of the surfaces 29, 31.

The spray openings 30, 32 that are arranged on opposing sides of the spray nozzle 7 may have the same patterns or different patterns and the patterns may be selected to correspond to the shape of the mould pockets 3. The pattern may be an ordered pattern such that the spray openings 30, 32 are aligned, or the pattern may be disordered such that the spray openings 30, 32 are randomly arranged. As shown in FIG. 14, further connecting fluid passages 33 may be provided in the upper portion 26b. As best shown in FIGS. 15 and 16, the spray openings 30, 32 have non-uniform shapes and sizes to produce a specific fluid pattern and direction of fluid. The spray openings 30, 32 may each be formed to ensure that fluid is directed to an entire surface of the mould pockets 3. The spray openings 30, 32 may be angled relative to a longitudinal axis L of the upper portion 26b that extends along the length $l_n$ of the spray nozzle 7. The spray openings 30, 32 may be angled to direct the fluid to a specific point along the mould pocket 3 or a specific location. For example, all of the spray openings 30, 32 may be angled inwardly toward a median line M extending perpendicular to the longitudinal axis L of the upper portion 26b. Different groupings of spray openings 30, 32 on the same surface may be angled to direct fluid at more than one specific point. The spray openings 30, 32 may have the same diameters or different diameters.

Using the spray nozzle arrangement 6 is advantageous in ensuring that heating fluid reaches an upper portion of the mould pockets 3. Accordingly, the heating fluid is more directly applied to the mould pockets 3 such that less energy is wasted as compared with conventional heating methods that continuously supply a heating fluid to the mould pockets. For example, using both the insulation plate 12 and the spray nozzle arrangement 6 may result in an energy savings for the ice cream moulding process that is between 30 and 40% as compared with conventional methods.

Figure 17:
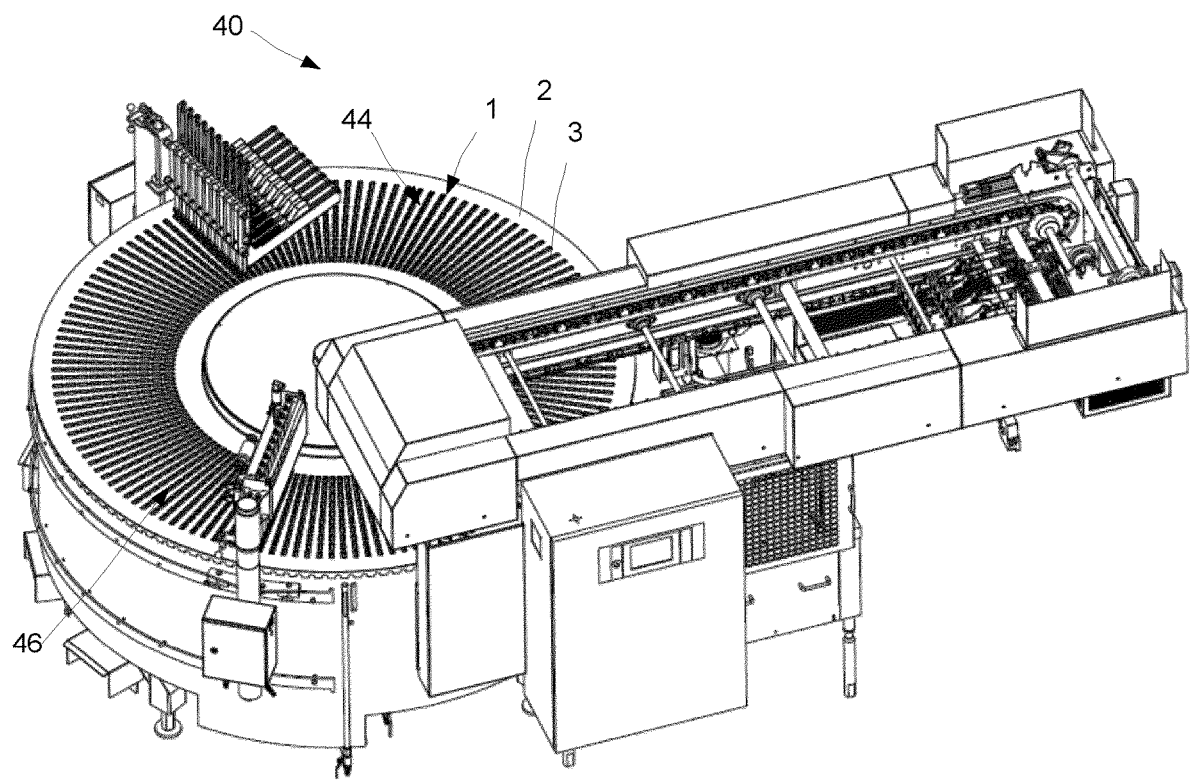
FIG. 17 is a perspective view of an ice cream mould table that includes the mould arrangement shown in FIG. 1.
Figure 18:
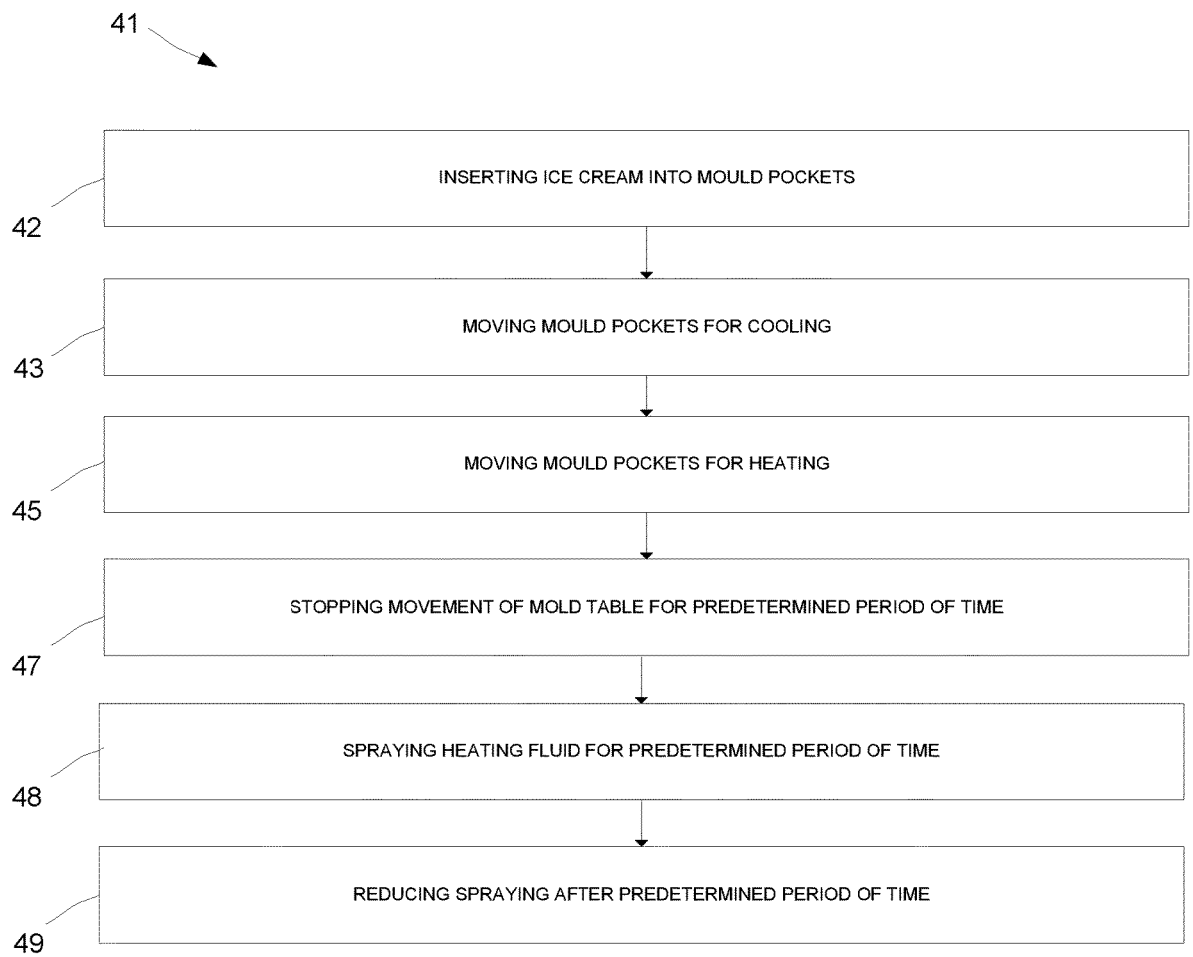
FIG. 18 is a flow chart of a method for processing ice cream with the mould table shown in FIG. 17.

Referring now to FIGS. 17 and 18, a rotary mould table 40 and a method 41 for processing ice cream with the mould table 40 are shown. The rotary mould table 40 includes the mould arrangement 1 as shown in FIGS. 1-16 and the rotary mould table 40 is configured for rotary movement of the mould arrangement 1. Although the table shown is a rotary table, the mould arrangement 1 may be formed as a rectangular plate that is suitable for use in a linear mould table. The mould arrangement 1 including the upper metal part 2 and the plurality of mould pockets 3 is movable for cooling and heating the mould pockets 3.

The method 41 includes inserting 42 ice cream or an ice water mix into the mould pockets 3 and moving 43 the mould pockets 3 by movement of the mould arrangement 1 to a first position 44 at which a cooling fluid, such as a brine solution having a temperature of around −40 degrees Celsius, is supplied to the exterior surface of the mould pockets 3, such that a temperature of the ice cream in the mould pockets 3 decreases. The ice cream or water ice mix may be supplied directly from a freezer having a temperature of around −3 degrees Celsius. The brine may be pumped to generate turbulence along the mould pockets 3. During the cooling process, sticks may be inserted into the ice cream product and the ice cream product may bulge relative to the mould pocket 3. The temperature of the cooling fluid may be dependent on the ingredients of the desired product.

After the cooling process, the method 41 includes moving 45 the mould pockets 3 to a second position 46 at which the mould pockets 3 pass by the spray nozzle arrangement 6 for heating, as shown in FIGS. 1-16. The spray nozzle arrangement 6 may be arranged in a fixed location within the rotary mould table 40 and the spray nozzles 7 may be configured to be in an alternating arrangement with the mould pockets 3 when the mould pockets 3 pass by the spray nozzle arrangement 6. The spray nozzle arrangement 6 supplies a heating fluid to the exterior surface of the mould pockets, such that a temperature of the ice cream in the mould pockets 3 increases. The heating fluid may have a temperature of approximately 20 degrees Celsius, but the temperature may be dependent on the ingredients of the desired product. Heating the ice cream in the mould pockets 3 facilitates extraction of the ice cream from the mould pockets 3, such as by an extraction unit. After extraction, the product may undergo a post-processing, such as being dipped in chocolate or coated with nuts, before being transferred to a wrapping machine.

In addition to using the spray nozzle arrangement 6, the energy used for cooling and heating the ice cream products may also be optimized by controlling the heating fluid. The method 41 may further include stopping movement 47 of the mould arrangement 1 for a predetermined period of time at the second position 46 in which the spray nozzles 7 are arranged between each of the mould pockets 3. The method 41 includes spraying 48 the heating fluid for a predetermined amount of time during the predetermined period of time when the mould arrangement 1 is stopped at the second position 46. The spraying 48 may occur during the entire predetermined period of time or for less than the entire predetermined period of time in which the mould arrangement 1 is stopped. After the heating fluid is supplied to the mould pockets 3, the method 41 includes reducing spraying 49 of the heating fluid after the predetermined period of time, when the mould arrangement 1 is again moving after the stopping movement. Thus, even heating of the mould pockets 3 is ensured without wasting energy as in conventional ice cream mould tables.

According to an aspect of the invention, a mould arrangement for moulding ice cream products includes an upper metal plate and a plurality of mould pockets that each protrude from a bottom side of the upper metal plate. An insulation plate is arranged adjacent the bottom side of the upper metal plate and through the plurality of mould pockets extend through the insulation plate.

The insulation plate may include an insulation layer and at least one support layer that is attached to the insulation layer to support the insulation layer.

The support layer may be made of a first material, and the insulation layer may be made of a second material different than the first material.

The first material may be carbon fiber and the second material may be a foam material.

The at least one support layer may be a first support layer that is attached to a first side of the insulation layer and the insulation plate may comprise a second support layer that is attached to a second side of the insulation layer that is opposite the first side of the insulation layer to support the insulation layer.

The upper metal plate may have a plurality of elements that protrude from the bottom side of the upper metal part and through openings in the insulation plate for securing the insulation plate to the upper metal plate.

The mould arrangement may include a space defined between the insulation plate and a wall of an adjacent one of the plurality of mould pockets.

The space may be tapered toward the upper metal plate.

The space may surround a peripheral section of the wall of the adjacent mould pocket.

According to another aspect of the invention, an ice cream mould table may include the mould arrangement, and a spray nozzle arrangement including a plurality of spray nozzles that are arranged to extend between the plurality of mould pockets in an alternating arrangement.

Each of the plurality of spray nozzles may have a cuboid shape including a height that extends along more than half of a height of the plurality of mould pockets.

Each of the plurality of spray nozzles may have at least one surface that defines a plurality of spray openings and faces a side wall of an adjacent one of the plurality of mould pockets.

Each of the plurality of spray nozzles may have at least two opposing surfaces that each define a plurality of spray openings.

A method for processing ice cream with a mould table includes inserting ice cream into mould pockets arranged in the mould arrangement, moving the mould pockets, by movement of the mould arrangement, to a first position at which a cooling fluid is supplied to an exterior surface of the mould pockets, such that a temperature of the ice cream in the mould pockets decreases, and moving the mould pockets, by movement of the mould arrangement, to a second position at which the mould pockets pass by the spray nozzle arrangement that supplies a heating fluid to the exterior surface of the mould pockets, such that a temperature of the ice cream in the mould pockets increases to thereby facilitate extraction of the ice cream from the mould pockets.

The method may include stopping movement of the mould arrangement for a predetermined period of time at the second position where the nozzles are located between the mould pockets, spraying the heating fluid for a predetermined amount of time during the predetermined period of time when the mould arrangement is at the second position, and reducing spraying of the heating fluid after the predetermined period of time, when the mould arrangement is again moving after the stopping movement.

While the invention has been described with reference to one or more preferred features, which features have been set forth in considerable detail for the purposes of making a complete disclosure of the invention, such features are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

The invention claimed is:

1. A mould arrangement for moulding ice cream products, the mould arrangement comprising:
   an upper metal plate, and
   a plurality of mould pockets that each protrude from a bottom side of the upper metal plate,
   wherein an insulation plate that is arranged adjacent the bottom side of the upper metal plate and through which the plurality of mould pockets extend, wherein the insulation plate has a thermal conductivity that is lower than the thermal conductivity of the upper metal plate,
   wherein the insulation plate surrounds the mould pockets by extending through vertically extending regions defined between adjacent mould pockets, and
   wherein a space is defined between the insulation plate and a wall of an adjacent one of the plurality of mould pockets.

2. The mould arrangement according to claim 1, wherein the insulation plate comprises
   an insulation layer, and
   at least one support layer that is attached to the insulation layer, to support the insulation layer.

3. The mould arrangement according to claim 2, wherein the at least one support layer is made of a first material, and
   the insulation layer is made of a second material different than the first material.

4. The mould arrangement according to claim 3, wherein the first material is carbon fiber and the second material is a foam material.

5. The mould arrangement according to claim 2, wherein
the at least one support layer is a first support layer that is attached to a first side of the insulation layer, and
the insulation plate comprises a second support layer that is attached to a second side of the insulation layer that is opposite the first side of the insulation layer to support the insulation layer.

6. The mould arrangement according to claim 1, wherein the upper metal plate has a plurality of elements that protrude from the bottom side of the upper metal part and through openings in the insulation plate to provide for securing the insulation plate to the upper metal plate.

7. The mould arrangement according to claim 1, wherein the space is tapered toward the upper metal plate.

8. The mould arrangement according to claim 1, wherein the space surrounds a peripheral section of the wall of the adjacent one of the plurality of mould pockets.

9. An ice cream mould table comprising:
the mould arrangement according to claim 1, and
a spray nozzle arrangement including a plurality of spray nozzles that are arranged to extend between the plurality of mould pockets in an alternating arrangement.

10. The ice cream mould table according to claim 9, wherein each of the plurality of spray nozzles has a cuboid shape including a height that extends along more than half of a height of the plurality of mould pockets.

11. The ice cream mould table according to claim 10, wherein each of the plurality of spray nozzles has at least one surface that defines a plurality of spray openings and faces the wall of an adjacent one of the plurality of mould pockets.

12. The ice cream mould table according to claim 11, wherein each of the plurality of spray nozzles has at least two opposing surfaces that each define a plurality of spray openings.

13. A method for processing ice cream providing the mould table according to claim 9, the method comprising:
inserting ice cream into mould pockets arranged in the mould arrangement,
moving the mould pockets, by movement of the mould arrangement, to a first position at which a cooling fluid is supplied to an exterior surface of the mould pockets, such that a temperature of the ice cream in the mould pockets decreases, and
moving the mould pockets, by movement of the mould arrangement, to a second position at which the mould pockets pass by the spray nozzle arrangement that supplies a heating fluid to the exterior surface of the mould pockets, such that a temperature of the ice cream in the mould pockets increases to thereby facilitate extraction of the ice cream from the mould pockets.

14. The method according to claim 13 further comprising:
stopping movement of the mould arrangement for a predetermined period of time at the second position where the spray nozzles are located between the mould pockets, and
spraying the heating fluid when the mould arrangement is at the second position, and
reducing the spraying of the heating fluid when the mould arrangement is again moving after the stopping movement.

* * * * *